Feb. 8, 1944.  J. MIHALYI  2,341,410
COMBINED RANGE AND VIEW FINDER FOR CAMERAS
Filed March 11, 1943
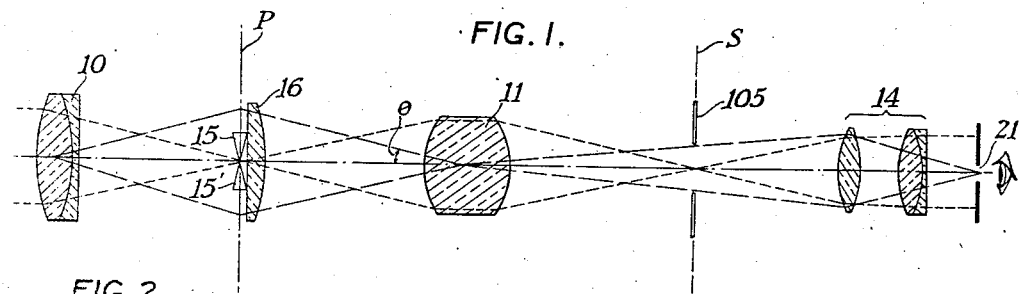
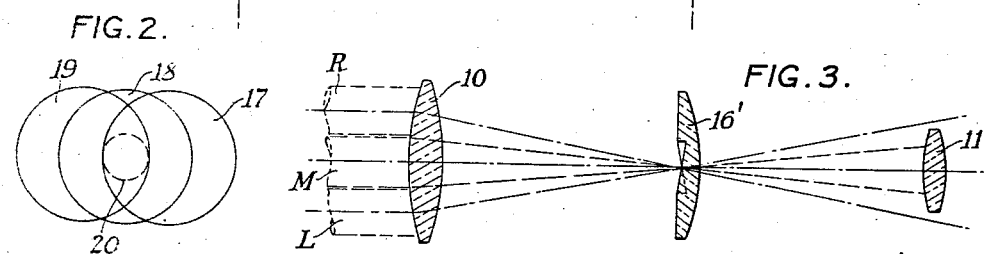
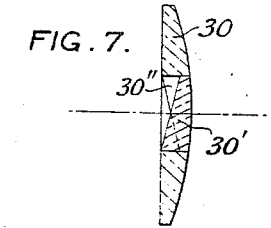 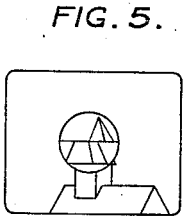 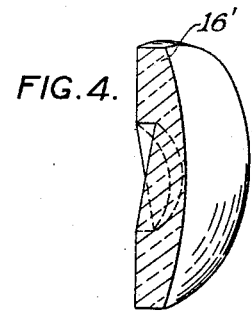
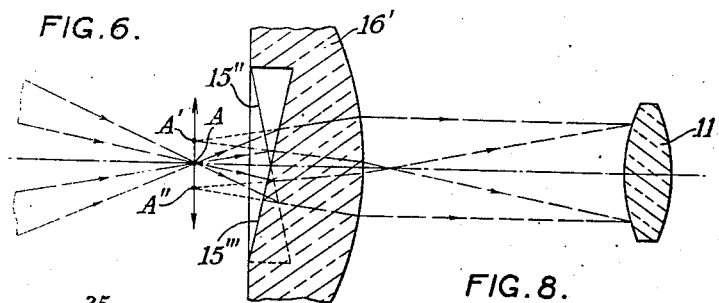
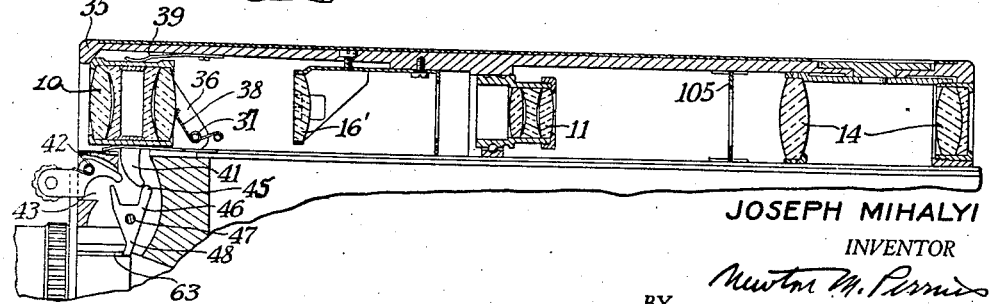
JOSEPH MIHALYI
INVENTOR
BY
ATTORNEYS Patented Feb. 8, 1944

2,341,410

UNITED STATES PATENT OFFICE 2,341,410

COMBINED RANGE AND VIEW FINDER
FOR CAMERAS

Joseph Mihalyi, Rochester, N. Y., assignor to
Eastman Kodak Company, Rochester, N. Y., a
corporation of New Jersey Application March 11, 1943, Serial No. 478,742

13 Claims. (Cl. 95—44)

The present invention relates to a combined range and view finder and/or a range finder alone, using a single objective, and particularly adapted for use on the motion picture camera to the focusing mechanism of which it can be coupled.

It has often been proposed to construct a base type range finder so as to employ one of the range finder beams for showing the field of view which a camera will photograph. However, the optical requirements for a view finder differ from those for range finders and make it difficult to satisfy both requirements without sacrifice. Furthermore, the majority of base type range finders have required a substantial separation of the incoming range finder beams so that they were not compact enough for use on motion picture cameras of the amateur type which generally have a relatively long and narrow case.

The idea of using a single lens as a view finder objective and as the base of the range finder has been broadly suggested (U. S. Patent 886,739, May 5, 1908), but such previous devices have been unsatisfactory because no means was provided for selecting the useful portions of the beams from the several fields so that they could be viewed simultaneously without shifting the eye to the proper position relative to the optical axis and holding it there unaided.

One object of the present invention is the provision of a combined range and view finder having but a single objective. Another object is the provision of a combined range and view finder in which the "range" field is split and appears in the center of the finder field. And another object is the provision of a combined range and view finder of the type set forth which includes a selector stop for isolating the useful portions of the beams of the system so that the three images (images of the view finder field and of the split field) will be visible in the eyepiece at all times regardless of whether or not the eye be shifted laterally of the optical axis while viewing, or, stating it in another way, so that all three images will be visible in the eyepiece at any time one is visible.

A further object is to provide a combined range and view finder system of the type set forth which includes an erector lens which serves three purposes, (1) it constitutes the selector stop above mentioned, (2) it erects the images, and (3) it relays the image to a secondary image plane and thereby lengthens the finder system to fit a motion picture camera which is relatively long. Another object is to provide a combined range and view finder of the type set forth which includes a combination light deviating means and field lens means comprising a single optical element which may or may not be made by molding a transparent moldable material. And another object is to provide a range finder separate from a view finder and having all of the attributes of the combination range and view finder noted above.

The novel features that I consider characteristic of my invention are set forth with particularity in the appended claims. The invention itself, however, both as to its organization and its methods of operation, together with additional objects and advantages thereof, will best be understood from the following description of the specific embodiments when read in connection with the accompanying drawing in which, Fig. 1 is a top plan view, in section, of a combined range and view finder optical system constructed in accordance with a preferred form of my invention, Fig. 2 is a showing of the images of the objective produced by the field lens in combination with the optical wedges in the plane of the erector lens.

Fig. 3 is a sectional view of the system back to the erector lens and including representative light rays to show the function of the erector lens, or its equivalent, in selecting the useful portions of the light beams deviated by the wedges. In this figure the wedges and field lens of Fig. 1 are replaced by a single optical element which is the combination of these three elements in structure and performance.

Fig. 4 is an enlarged sectional perspective of an optical element which combines the two optical wedges and field lens shown in Fig. 1 into one element, and which element may be made by molding a transparent moldable material.

Fig. 5 shows the form of the images formed by the combined range and view finder system shown in Fig. 1, Fig. 6 is an enlarged sectional view of the element shown in Fig. 4 in conjunction with the erector lens, and including representative light rays to show how the images are displaced on opposite sides of the optical axis when the objective is not correctly focused on the primary image plane, Fig. 7 is a sectional view showing another way in which the light deviating means and field lens means may be combined into a single optical element, and Fig. 8 is a partial side view of a motion picture camera incorporating a combined range and view finder system constructed in accordance with the present invention, partly in section, and showing how the range and view finder can be coupled to the focusing mechanism of the camera.

Broadly, the present combined range and view finder system consists of the inclusion of a split-field type range finder in a telescopic view finder system in such a way that the major image-forming objective is used both for forming the general field image of the view finder field and for directing the marginal horizontal rays through the optical wedges interposed in the focal plane and forming the split-field range finder.

Referring now to the drawing, and particularly to Fig. 1, a combined range and view finder system constructed in accordance with the present invention comprises a wide aperture objective 10 which forms an image of a field of view including an object to be "ranged" in the primary image plane P. The objective 10 is so mounted that it can be moved axially to focus it relative to the primary image plane and any suitable means, one form of which is shown in Fig. 8 and will be described hereinafter, is provided for focusing the objective relative to said plane. The image of the field of view which is inverted in the primary plane P is erected and relayed to the secondary image plane S by an erector lens 11. This erected and relayed image is then observed through the eyepiece 14. The elements set forth up to this point constitute a simple erecting telescope for viewing the general field of view of the finder.

Located substantially in the primary image plane P are means for deviating differently and horizontally light from the object and incident on two adjacent portions of said plane which include the object in the field of view which is to be "ranged." Throughout this specification when I refer to the "ranging" of an object I mean that the objective 10 is focused so that image of said object will be in the primary image plane P. In Fig. 5 the top of the church steeple appearing in the circular split-field is the object in the field which is used for ranging. As shown, this light-deviating means may comprise a pair of small optical wedges 15 and 15' lying in adjacent relationship on opposite sides of the optical axis (one above and one below said axis looking through the finder) and usually inverted so that their bases lie on opposite sides of the axis in a horizontal direction (looking through the finder). These wedges are located with their line of intersection in the primary image plane P. The wedges receive light from the object to be ranged incident on two adjacent portions of the plane P and deviate each of the rays in opposite directions horizontally on opposite sides of the optic axis when the objective is not focused on the primary image plane, as will be fully set forth below. In referring to the deviation of the range as being "horizontal" I am using the term to designate relative movement of the two images in opposite directions in the same plane and looking at the field of view through the eyepiece, see Fig. 5.

Located substantially in the primary image plane P is a field lens 16 which projects an image of the objective 10 upon the erector lens 11. As shown, the wedges 15 and 15' may have their straight faces cemented to the plane surface of the field lens. Inasmuch as the wedges 15 and 15' are located with their line of intersection, or principal deviating plane, in the primary image plane they do not affect the image in that plane itself, but they deflect the beams of light passing through them, one to the right and one to the left, horizontally of the optical axis (looking through the finder). Thus, in the plane of the erector lens 11 are formed three overlapping images of the objective 10, one direct, and one through each of the wedges, respectively. As seen from the rear, these images overlap as shown in Fig. 2, the one designated as 17 being deviated by prism 15, the one designated as 18 being the direct one, and the one designated as 19 being deviated by prism 15'. A selector stop is placed in the system at the erector lens to select, or isolate, the mutual overlapping portion of the three overlapping images of the objective 10. While the overlapping portion of the three images is generally elliptical in shape, see Fig. 2, I have indicated the portion which would ordinarily be selected as a dotted circle 20, because in the preferred embodiment of my invention this selector stop is provided by making the erector lens 11 of such diameter that it just occupies the area indicated by the dotted circle 20. This selector stop could just as well take the form of an actual aperture stop located at the erector lens, and then such a stop could take an elliptical form to include the entire overlapping portion of the three images 17, 18, and 19, and thereby get the maximum light into the eyepiece.

The light beams selected, or isolated, by the selector stop are projected to the eyepiece 14 and fill the exit pupil 21 of the system at which the eye is located. By virtue of this selector stop, when any one of the three images (referring to the three parts into which the field is as shown in Fig. 5 is divided) is visible in the eyepiece, they are all visible so that there is no need for shifting the eye around the optical axis in an effort to locate the images simultaneously. If there were no selector stop in system, as is true of the prior art, it will be appreciated that the eye could be so located relative to the optical axis that only the overlapping portion of two of the images 17, 18, and 19 of Fig. 2 would be viewed, instead of three, in which case the image illuminated by the beam cut off would not be visible and the system would be useless.

The paths of the beams of light through this system will be readily understood by considering the ray diagram of Fig. 3 in conjunction with Fig. 2. As clearly shown in Fig. 3, projected back into the plane of the objective 10, we find three images of the erector lens lying across the middle of the objective aperture, of which the central image admits the direct beam, and the other two images are produced by the wedges 15 and 15' respectively. These three apertures are the respective entrance pupils of the three beams. An oblique beam enters the system through all three pupils, and the separate circular beams R, M and L in Fig. 3 are all superposed at the erector lens 11 by the field lens 16 no matter at what obliquity they may enter the system. It must not be supposed that three apertures could be mounted in front of the objective lens in place of the selector stop at the erector lens; because if this were done, the wedges would form nine apertures in all at the eye, of which the center three would overlap, and if the eye failed to receive these three beams, the device would not operate.

The wedges 15 and 15' are constructed so as to have an angle of deviation slightly less than the angle θ subtended by the radius of the objective 10 at the primary image plane P. When referring to the radius or diameter of the objective 10, I am not referring to the physical dimensions of the same, but I am referring to the radius of the effective aperture of the lens which enters into a consideration of the size of the exit pupil of the system. The angle of deviation of the wedges 15 and 15' is preferably so chosen that the wedges receive and deviate light from the object to be ranged incident on two adjacent portions of the primary image plane equally in opposite directions.

Referring to Fig. 2, it will be obvious that the selector stop isolates portions of the two images 17 and 19 which are at extreme opposite edges of the two images. Consequently, it follows that only the marginal rays entering the objective 10 are utilized in the range finder part of the system, and the effective diameter of the objective forms the base of the range finder.

The ranging function of the system will be obvious from an examination of Fig. 6. If the objective 10 is moved forwardly, so that the intersection point of the two wedges falls behind the image as shown, then the parts of the images seen through the wedges are displaced, one to the right and one to the left as shown in Fig. 5. In Fig. 6, the actual position of the out-of-focus image will be at A while its apparent position when viewed through one of the wedges will be at A' to the right of the optic axis and its apparent position viewed through the other wedge will be at A''. The two parts of the church steeple in the split-field of Fig. 5 can be considered as displaced images such as A' and A'' just referred to. Thus, there is provided a very satisfactory coincident setting marking the exact focusing adjustment in which the image falls precisely upon the intersection of the wedges, or at the primary image plane.

The sensitivity of this device as a means of locating the exact focus of the objective 10 is, of course, governed by the angle of the wedges, which is in turn limited by the relative aperture of the objective lens. However, considering this system as used on a camera, the vernier acuity of the eye is so high that it may well be better than the resolving power of the emulsion of a light-sensitive film. In the last analysis, assuming similar objective lenses are used in the camera on which the system is to be used and in the system itself, the vernier acuity of the eye is being used in the range finder, and the resolving power of the camera objective is being used in the camera. It is well known that the vernier acuity is much higher than the resolution. The sensitivity of this two-wedge system as a means of locating the precise focal plane is, therefore, likely to be far higher than if ground glass is used as a focusing screen. Furthermore, the present system will form a much brighter image than one using a ground glass for focusing.

I have found that the two wedges 15 and 15' and the field lens 16 can be combined into a single optical element 16' of the form best shown in Figs. 4 and 6. This optical element, as shown, comprises a plano-convex field lens in the central portion of the plano face of which are formed two angularly recessed areas 15'' and 15''' which are equivalent to the wedges 15 and 15' shown in Fig. 1. The use of this optical element 16' in the system in place of separate wedges 15 and 15' and field lens 16 of Fig. 1 is shown in Figs. 3 and 6. The angular recessed areas of the optical element 16' form wedges which are mutually inverted with respect to one another and function in combination with the convex face of the element in the same sense that the wedges 15 and 15' cooperate with the field lens 16 in the arrangement shown in Fig. 1. The optical element 16' can be easily and cheaply made by molding the same from a transparent moldable material, such as Lucite, and the wedges can be formed in the plano-face thereof during the molding operation. The flatness of the wedge surfaces is unimportant, but they must be free from chips and scratches. Forming the wedges in the field lens itself also helps to produce an invisible field boundary.

The field lens and optical wedges may also be combined as shown in Fig. 7. In this instance, the field lens 30 is formed with a hole through its central portion and in this hole are cemented two mutually inverted prisms 30' and 30''. In this instance, the face of the prisms 30' and 30'' remote from the primary image plane are made convex to give the effect of a field lens behind the wedges.

It will be appreciated by those skilled in the art that the range finder feature of the combined system set forth can be used without the view finder feature and the invention is intended to cover this sole use as well as the combination. In this instance, the wedges 15 and 15' will be enlarged to cover the whole image in the primary image plane, rather than only the central portion thereof. Then there will be only two overlapping images of the objective formed in the plane of the erector lens by the field lens instead of three, as shown in Fig. 2, and the split-field shown in Fig. 5 will cover the entire field of view instead of only the central portion as shown.

The objective 10 can be mounted in a supporting structure in any suitable manner to be capable of axial movement for focusing relative to the primary image plane. In addition, the objective can be connected to any type of range indicating scale so that its movement to a focusing position will indicate on the scale the distance of the object being "ranged."

Since this combined range and view finder is particularly adapted for use on a motion picture camera to the focusing mechanism of which it can be directly coupled, I have shown the system combined with such a camera in Fig. 8 to point out its usefulness. The structure shown in Fig. 8, other than the optical system, forms no part of the present invention, and is fully disclosed in U. S. patent application, Serial No. 403,202, filed July 19, 1941, in the name of Otto Wittel, to which reference can be had for a complete understanding of the coupling between the present range and view finder system and the focusing mechanism of the camera objective.

As shown in Fig. 8, the finder objective 10 is pivotally mounted in the forward end of the finder housing 35 to move through an arc. The pivot point of the finder objective is so located relative to the finder objective that a small arc of movement of the objective is substantially a straight line at an angle to the optical axis of the finder system, whereby the objective is simultaneously moved along the optical axis of the system for focusing and laterally of the optical axis for the correction of parallax. The angle of movement of the finder objective will depend upon the lateral spacing of the finder objective and the camera objective, because it is this spacing which must be accounted for in the correction of parallax as those skilled in the art are well aware. The finder objective includes two rearwardly extending arms 36 on either side of the mount which are pivoted at 37 in the side walls of the finder housing. The finder objective is normally pivoted in a counter-clockwise direction by the action of the spring 38, acting on the rear end of the objective mount, and the spring 39 fixed to the top wall of the housing and pressing downwardly upon the top of the objective mount.

An arm 41 fixed to the finder objective mount extends from the lower side thereof through an opening 42 in the top wall of the camera and into a recess 43 formed in the upper front portion of the camera directly behind the front wall of the camera. The end of this arm engages the nose 45 on the bellcrank 46 pivoted at 47 in the recess 43 of the camera. This lever 46 includes an arm 48 the end of which normally extends to a point behind the lens socket of the camera where it is adapted to engage a cam or cam follower 63 carried by the camera objective and which moves axially of the optical axis of the objective as the camera objective is focused. Movement of the cam is transmitted to the finder objective 10 through the members 41 and 46 to cause the finder objective to focus on the primary image plane P (which is located in the plane of the film in the camera). Thus, if the finder objective and the camera objective are similar, then when the finder objective is focused on the primary image plane of the finder system the camera objective will be in focus on the film plane. The entire field of view seen in the finder, which may be determined by a field defining means 105 located in the secondary image plane of the finder sytsem, will be the exact field imaged on each frame of film in the camera.

It will be observed that my present combined range and view finder is particularly adapted for use with a motion picture camera for several reasons, and these reasons will be set forth hereinafter to clearly bring out the advantages and primary features of the system as a whole. First, the erector lens 11, in addition to erecting the image and selecting the useful portion of the three overlapping beams of light emerging from the wedges, relays the image from the primary to the secondary image plane and lengthens the system to fit the top of the camera. Since the finder objective can be similar to the camera objective, and the erector lens can be made to give a unitary magnification, the field in the finder will correspond to that photographed on the film. The finder objective may readily be moved to correct for parallax, and since the longitudinal focusing motion and lateral parallax compensating motion of the finder objective are both proportional to the reciprocal of the object distance, a sloping linear movement of the objective will satisfy both requirements automatically.

The range finder field is in the center of the view finder field, which is the only logical place to put it. The "range" images fall into coincidence at the same point as they fall into sharp focus, and at this point the "range" field melts into the background, and the boundary of the range field disappears from view. The wedges do not introduce any coma or astigmatism into the image because they are in the focal plane. At any other point in a converging beam a wedge cannot be used as it would spoil the image quality. The range finder depends upon the vernier acuity of the eye, whereas the camera uses only the resolution of the camera lens. The wedges, therefore, give a much more sensitive focusing device than would a ground glass. There is a focused image in the range finder housing in which the field defining means (fixed or adjustable) may be placed. Other scales, footage indicator, etc., can be placed in the same image plane if desired. Since no ground glass is used, visual brightness of the image is almost equal to that of the object itself; therefore, the range finder can be used on any object bright enough to be visible to the naked eye.

Although I have shown and described certain specific embodiments of my invention, I am fully aware that many modifications thereof are possible. My invention, therefore, is not to be limited to the precise details of construction shown and described, but is intended to cover all modifications coming within the scope of the apended claims.

Having thus described my invention, what I claim as new and desire to secure by Letters Patent of the United States is:

1. A combined range and view finder for viewing a field of view including an object to be ranged, comprising an objective for forming an image of said field and object in a primary image plane, means for focusing the objective relative to said plane, means substantially in said plane for deviating differently and horizontally light from the object and incident on two adjacent portions of said plane, the differential deviation angle being less than that subtended by the objective diameter at said plane, field lens means also substantially in said plane and extending over all of said field image for forming in the plane conjugate to the objective with respect to the field lens means three mutually overlapping images of the objective, a selector stop substantially in said conjugate plane to select an overlapping portion of all three objective images, and means for viewing through said stop the images in said plane whereby the parts of said object image in said two adjacent portions appear in coincidence only when the objective is correctly focused on the object.

2. A combined range and view finder for viewing a field of view centrally including an object to be ranged comprising an objective for forming an image of said field and object in a primary image plane, means for focusing the objective relative to said plane, means substantially in said plane and near the optic axis of the objective for deviating equally in opposite directions light from the object incident on two adjacent portions of said plane, the angle of each deviation being less than that subtended by the radius of the objective at said plane, field lens means also substantially in said plane and extending over all of said field image for forming, in the plane conjugate to the objective with respect to the field lens means, three mutually overlapping images of the objective, a selector stop substantially in said conjugate plane to select an overlapping portion of all three objective images, and means for viewing through said stop the image in said plane, whereby the parts of said object image in said two adjacent portions appear in coincidence only when the objective is correctly focused on the object.

3. A combined range and view finder according to claim 2 including in said selector stop an erector objective for relaying the field and object image to a secondary image plane, and including, as said viewing means, an eyepiece in alignment with the erector objective for viewing the relayed image.

4. A combined range and view finder for viewing a field of view centrally including an object to be ranged, comprising an objective for forming an image of said field and object in a primary image plane, means for focusing the objective relative to said plane, means substantially in said plane and near the optic axis of the objective for deviating equally in opposite directions light from the object incident on two adjacent portions of said plane, the angle of each deviation being less than that subtended by the radius of the objective at said plane, field lens means also substantially in said plane and extending over all of said field image for forming, in the plane conjugate to the objective with respect to the field lens means, three mutually overlapping images of the objective, an erector lens substantially in said conjugate plane having a diameter to select only an overlapping portion of all three objective images and for relaying the field and object image to a secondary image plane, and an eye piece for viewing the relayed image, whereby the parts of said object image in said two adjacent portions appear in coincidence only when the objective is correctly focused on the object.

5. A combined range and view finder according to claim 4 including field defining means in said secondary image plane.

6. A combined range and view finder according to claim 2, and in which said light deviating means comprises a pair of optical wedges extending transversely of the optical axis of the objective with their bases on opposite sides of said optical axis and having their principal deviating plane lying in said primary image plane.

7. A combined range and view finder according to claim 2, and in which the light deviating means and field lens means consist of a single optical element with a convex surface and a plano-surface the central portions of which are angularly recessed.

8. A combined range and view finder according to claim 2, and in which the deviating means and field lens means consist of a transparent molded element having a convex surface and a plano-surface the central portions of which are angularly recessed during the operation of molding the element.

9. A range finder comprising an objective for forming in a primary image plane an image of the object to be ranged, means for focusing the objective relative to said plane, combination field lens and deviating means substantially in said plane for deviating differently and horizontally light from the object incident on two adjacent portions of said plane, the differential deviation angles being less than that subtended by the objective diameter at said plane, and for forming, in the plane conjugate to the objective with respect to the field lens means, two overlapping images of the objective, a selector stop substantially in said conjugate plane to select an overlapping portion of said two objective images, and means for viewing through said stop the image in said primary image plane, whereby the parts of said object image in said two adjacent portions appear in coincidence only when the objective is correctly focused on the object.

10. A range finder comprising an objective for forming in a primary image plane an image of the object to be ranged, means for focusing the objective relative to said plane, combination field lens and deviating means substantially in said plane for deviating differently and horizontally light from the object incident on two adjacent portions of said plane, the differential deviation angles being less than that subtended by the objective diameter at said plane, and for forming, in the plane conjugate to the objective with respect to the field lens means, two overlapping images of the objective, an erector lens substantially in said conjugate plane having a diameter to select only an overlapping portion of the images and for erecting and relaying the object image to a secondary image plane, and an eyepiece for viewing the relayed image, whereby the parts of said object image in said two adjacent portions appear in coincidence only when the objective is correctly focused on the object.

11. A range finder according to claim 9, and in which said combination field lens and deviating means comprises a pair of optical wedges extending transversely of the optical axis of the objective with their bases on opposite sides of said optical axis and having their principal deviating plane lying in said primary image plane, the differential deviation angle of said two wedges being less than that subtended by the objective diameter at the primary image plane, and field lens means also substantially in said primary plane and extending over said two adjacent portions of said image plane.

12. A range finder according to claim 9, and in which the combination field lens and deviating means consist of a single optical element with a convex surface and a plano-surface the central portions of which are angularly recessed.

13. A combined range and view finder for use in conjunction with a camera having a focusable lens and for viewing a field of view including an object to be ranged, and comprising an objective having the same focal length as the camera lens for forming an image of said field and object in a primary image plane, means for simultaneously focusing the objective relative to said primary plane and the camera lens relative to the exposure plane of the camera, whereby the image formed by said camera lens will be in focus on the exposure plane when the finder field image is in focus on said primary plane, means substantially in said primary image plane and near the optic axis of the objective for deviating equally in opposite directions light from the object incident on two adjacent portions of said primary plane, the angle of each deviation being less than that subtended by the radius of the objective at said plane, field lens means also substantially in said primary plane and extending over all of said field image for forming, in the plane conjugate to the objective with respect to the field lens means, three overlapping images of the objective, an erector lens substantially in said conjugate plane, having a diameter to select only an overlapping portion of all three objective images, for relaying the field and object images to a secondary image plane with unit magnification, a field defining means in one of said image planes, and an eyepiece for viewing the relayed image, whereby the parts of said object image in said two adjacent portions appear in coincidence only when the objective is correctly focused on the object and the camera lens is accordingly focused on the exposure plane of the camera.

JOSEPH MIHALYI.